३,६९२,६४७
Patented Sept. 19, 1972

3,692,647
ELECTROLYTIC COPPER PRODUCING PROCESS
Wayne L. Chambers and Ronald W. Chambers, Fontana, Calif., assignors to Chamber's Process, Ltd., and Philip Zurich, fractional part interest to each
Filed Jan. 25, 1971, Ser. No. 109,473
Int. Cl. C22d 1/00; B01k 3/08, 3/10
U.S. Cl. 204—105 R              34 Claims

ABSTRACT OF THE DISCLOSURE

A process for producing metallic copper comprising the steps of: (1) leaching a copper-containing ore with a leaching solution under substantially oxygen-free conditions, the leaching solution comprising cupric chloride and a solubilizing agent for cuprous chloride, the leaching being for a time at a temperature sufficient to chemically convert at least a substantial proportion of the copper in the ore to a reaction product of the copper and the agent, which product is soluble in the resulting solution: (2) separating the remaining solids from the resulting solution subsequent to the leaching step, while maintaining the substantially oxygen-free conditions; (3) electrolytically (a) reducing at least a portion of the resulting solution to precipitate copper metal from the reduced solution and (b) oxidizing at least a portion of the resulting solution to produce a solution comprising cupric chloride; the electrolytic reduction and oxidation being carried out under conditions whereby the reduced solution is of lesser specific gravity than the resulting solution, and whereby the oxidized solution is of greater specific gravity than the resulting solution, while maintaining the substantially oxygen-free conditions; (4) combining: (a) the reduced solution of the reduction step with (b) the oxidized solution of the oxidation step; while maintaining the substantially oxygen-free conditions, and thereby forming the aqueous leaching solution; and, (5) recovering the precipitated metallic copper.

DISCLOSURE OF THE INVENTION

This invention relates to a process for producing metallic copper. More particularly, the invention relates to a metallic copper producing process which avoids the roasting process of existing processes.

In U.S. Pat. No. 507,130, a process is disclosed in which copper ore is leached with an aqueous cupric chloride solution and thereafter the solution is subjected to electrolysis in order to deposit the metal on the cathodes. The process was tried on an industrial scale in 1913, but it was soon abandoned for failure to produce copper on a sustaining basis. (See: Theoretical and Applied Electrochemistry, Thompson, p. 225–6, 1939.)

The present invention provides a process for producing metallic copper and in the preferred embodiment the metallic copper is in the form of a powder. The copper which is produced has a purity of 99.9% and greater, and is free of sulphur or sulfate contaminants. All ores, including sulphides, carbonates, arsinates, and oxides of copper as well as copper metal are readily processed into the pure copper product. Under controlled conditions the process produces no harsh effects upon the ecological system of the environment. The environmental soil, air and water are not polluted by any waste products of this process. Accordingly, the process provides an economically attractive and relatively uncomplicated method for producing pure copper metal and preferably pure copper metal in the powdered form.

Briefly, the present invention comprises a process including the steps of leaching pulverized copper containing ore with a leaching solution containing cupric chloride and a solubilizing agent for cuprous chloride wherein the copper leached from the ore and the cupric copper of the leaching solution are chemically converted to a soluble metal complex of cuprous copper chloride. The metal complex may be understood to consist of a non-copper cation and an anion comprising a covalent union of copper and at least another atom. The net negative charge on this anion balances the net positive charge of the associated cation. Leaching is followed by separation of the solids from the complexed cuprous copper chloride resulting solution and thereafter electrolytically reducing a portion of the complexed cuprous copper chloride to pure copper metal and oxidizing a portion of the complexed cuprous chloride to cupric copper chloride. The respective reduced and oxidized solutions emanating from the electrolytic cell are combined and are recycled as the leaching solution. The copper is recovered from the cell as powdered copper in the preferred embodiment.

The process should be carried out under conditions which substantially prevent the copper from coming in contact with oxygen. The reason for this is that under the conditions herein described the copper is readily converted to an insoluble oxychloride of copper. In actual operation it has been found that prevention of copper-oxygen contact may be readily achieved by permitting the various solutions hereinafter described to have their surfaces contact the air thereby allowing a surface crust of copper oxides such as cupric oxychloride and oxides and oxychlorides of other metals in the solution, such as iron oxide and the like to form on the surface thereof. This surface crust acts as an oxygen barrier for the rest of the solution in that particular vessel. In actual oepration the crust remains on the surface at all times, while the solution below it is being operated on and moved through the vessel. Furthermore, the various conduits carrying liquids to and from the various vessels have their inlet and outlet terminals below the liquid surface thereby also preventing contact of the liquid with air. The pumps used in the process are preferably of the non-air entraining type, i.e., they exclude air from being comixed with the fluid being pumped therethrough.

The process of this invention is carired out by converting the copper in the ore into the cuprous form of copper and thereafter by utilization of a solubilizing agent, converting the cuprous copper into a soluble complex wherein the copper is a part of the anion of the complex. The copper in the anion is believed to be in its +1 valance state, namely in the cuprous form. Subsequently, a portion of the complexed copper is reduced to metallic copper and simultaneously another portion of the complexed copper is oxidized to cupric copper. The reduced solution and oxidized solution are combined and used as the leaching solution to convert the copper in the ore to the cuprous form as previously disclosed. In other words, the process repeatedly uses the same material in order to produce the metal copper product. In theory the only raw materials that are consumed in this copper metal producing process, are the ore and energy for heating purposes, agitation and pumping purposes, and for purposes of energizing the electrolytic cell. In certain instances solubilizing agents may have to be replenished.

It is important to note that the solution which is fed into the electrolytic cell is the same for the cathode electrolyte and the anode electrolyte. However, we have found that the respective electrolytic reactions, which cause the formation of copper metal and cupric chloride also results in specific gravity changes in these solutions. The reduced solution, which has had at least a portion of its copper content precipitated has a specific gravity less than the influent electrolyte. On the other hand, the oxidized solution, which has had at least a portion of its copper content converted to the cupric form has a specific gravity greater than the influent electrolyte. As a consequence, the herein disclosed process must be operated under conditions which substantially removes the reduced and oxidized solution, respectively, and not any other materials in the cell. In the preferred embodiment, the anode electrolyte is fed into the top end of the cell and removed at the opposite bottom end of the cell, conversely for the cathode electrolyte. This arrangement provides for continuous operation of the process. The influent electrolyte which contains copper in its cuprous state is electrolyzed to copper metal and cupric copper. The former is the product and the latter comprises regenerated leaching solution.

If the solutions removed from the cell were not in accordance with this disclosure, and were removed as practiced in the prior art, i.e., Pat. No. 507,130, then in the case of anode effluent being removed from the top, there would be a continual buildup of cupric copper in the lower portion of the anode chambers. The removed solution would soon be devoid of cuprous copper, and consequently, devoid of leaching solution. It is therefore imperative that the electrolyte removal procedure be in accordance with this disclosure in order for the process to be operative on a continuous and economic basis.

The ore, in most cases, contains significant proportions of other metals. These may include silver, manganese, antimony, bismuth, iron, lead, zinc, cobalt, nickel, molybdenum, chromium, mercury and the like in addition to copper. This process also provides method steps for the recovery of these metals and any other metals that form a soluble halide or forms a soluble complex. For example, during the leaching operation, these metals which are found in the ore are chemically converted into their water soluble chloride salts or chloride complexes (i.e., silver). Prior to the electrolytic operation, the other metals are recovered. The non-copper metal salts are reacted with lime into their oxides and precipitated as such. The silver is recovered as precipitated metal by replacement of silver ion with copper ion in the silver complex which has previously been formed.

The solids from the ore remaining after leaching has been completed may advantageously be processed to recover copper cement from a solution which has been admixed with and separated from the solids by contacting that solution with metallic iron. Furthermore, these solids may be treated to recover noble metals and sulphur.

Reference is now made to the figures which describe the process by way of example and are not intended to be limiting to the spirit and scope of this invention.

Figure 1:
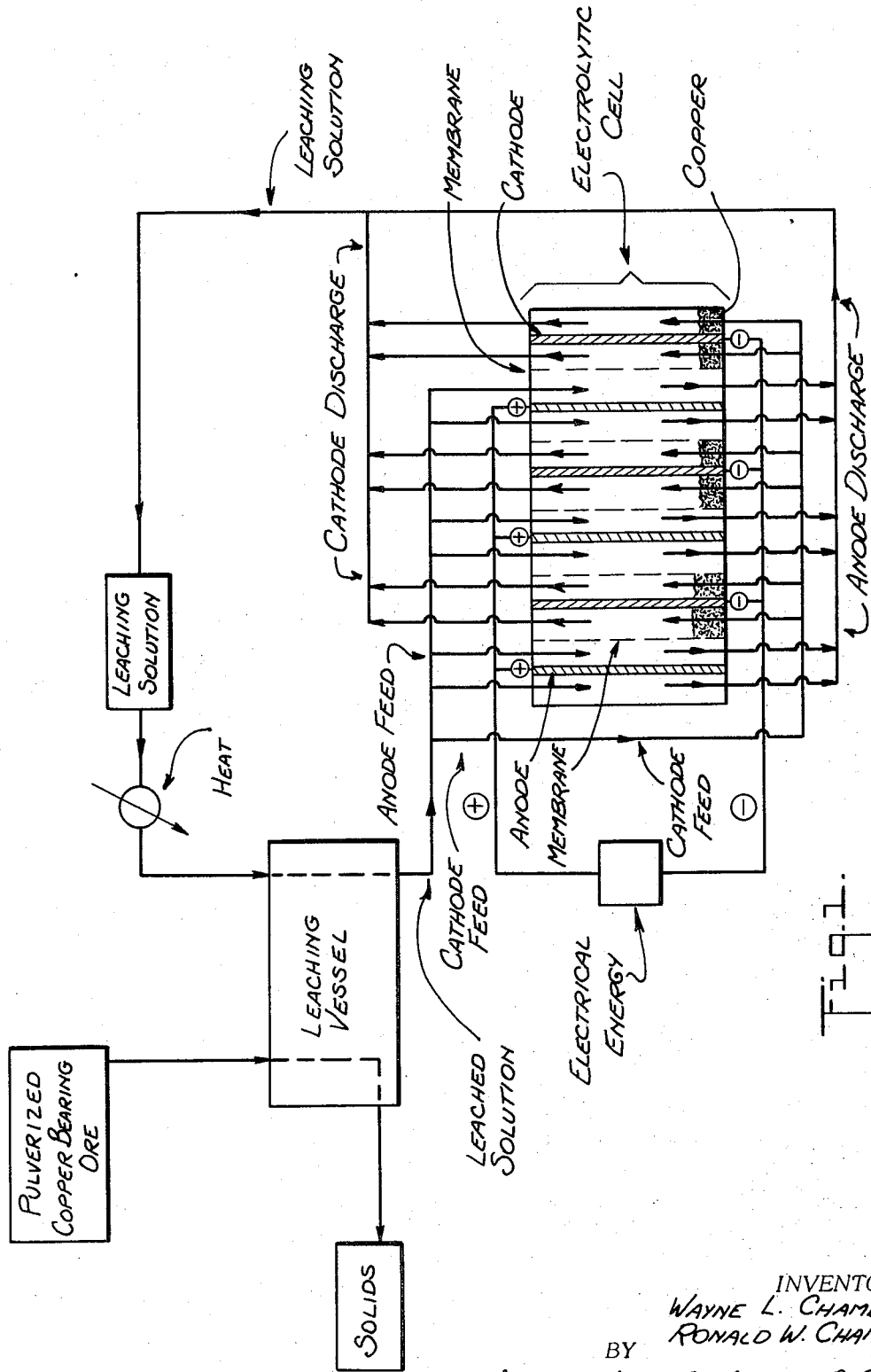
FIG. 1 is a block form flow diagram of the basic process.

Referring now to FIG. 1, preferably pulverized copper bearing ore is fed into a leaching vessel where it is admixed with a heated leaching solution. It is preferred that this operation take place under at least agitated conditions such as caused by a rotating impeller or under grinding or pulverizing conditions such as would occur if the leaching vessel were a ball mill. Where increased pressure and temperature is required the ball mill, for example, can be sealed after being charged and subjected to heating. The time required for the leaching operation may vary from about 1 hour to about 6 hours depending upon the operating temperature and the tenor of the ore. Operating temperatures have been varied between about ambient, namely, about 60° F. and up to temperatures of super heated solutions in the range of about 300° F. and greater. For example, leaching can be accomplished from a 5% oxide ore in about one hour at about 275° F., and in about four hours when the temperature is in the range of about 125° F.

The ore which is fed to the leaching vessel may contain copper in any of the amounts usually found in mined ore. For example, commercial copper ore may vary as economically feasible. Copper ores have been used in the range of .01% and less up to about 80% and greater. The ore may be used as mined and fed directly to the leaching vessel or it may be pre-ground or pulverized prior to addition. Furthermore, the ore may be concentrated in its copper content by any conventional means in order to increase the ratio of copper to gangue which is fed to the leaching vessel. The copper contained in the ore may be in any of its naturally found forms. For example, it may be in the elemental state, in any one of its cupric or cuprous oxides or as the cupric sulfide. As discussed below copper in any one of these forms may be converted to the pure copper metal.

As pointed out above, the ore may also contain various other metals. These metals may also be either in the elemental form or chemically combined as oxides or salts.

The leaching solution is an aqueous solution of cupric chloride and a solubilizing agent which acts to complex or otherwise solubilize cuprous copper in the form of an anion which is a covalently bonded cuprous copper atom to at least another atom, the net charge of the anion being balanced by the cation supplied by the solubilizing agent. Among the preferred solubilizing agents are the halide salts of alkali metals such as sodium chloride, potassium fluoride, lithium bromide. Sodium chloride is preferred. Other agents include calcium chloride and hydrogen chloride, bromide and iodide. Generally, any materials which form cuprous copper complexes, as described, can be used as a solubilizing agent. The proportion of cupric chloride in the leaching solution is maintained in about ½ pound of copper in the cupric form for each gallon of solution. The proportion of the solubilizing agent, for example sodium chloride, in the leaching solution is based upon at least stoichiometric requirement for complexing the cuprous chloride and silver chloride produced in the leaching vessel. Generally, the calculation proceeds as follows: The proportion of cupric copper in the leaching solution is sufficient to leach its equal weight of copper from the ore and convert that copper to cuprous chloride as well as the cupric copper in the leaching solution to cuprous copper. As a result, the solution resulting from the leaching operation contains approximately 1 pound of cuprous copper for each ½ pound of cupric copper entering the leaching vessel in the leaching solution. The additional ½ pound of copper is provided by the ore. Based upon this ratio the proportion of sodium chloride used is equimolar with the cuprous chloride and silver chloride in the resulting solution.

Sodium chloride reacts with the cuprous chloride and the silver chloride, each of which was produced during the leaching operation by reaction of these respective metals (metallic or ionic form) with cupric chloride. The products of this reaction are the sodium complexes of cuprous chloride and silver chloride.

The chemical reactions which are believed to take place in the leaching vessel may be represented as follows:

$$Cu° + CuCl_2 \rightarrow 2CuCl \qquad (1)$$

$$Cu_2S + 2CuCl_2 \rightarrow 4CuCl + S° \qquad (2)$$

$$CuCl + NaCl \rightarrow Na^+ + (CuCl_2)^-$$
(Soluble Complex-Copper) (3)

$$AgCl + NaCl \rightarrow Na^+ + (AgCl_2)^-$$
(Soluble Complex-Silver) (4)

After the leaching period, at which time the various metals to be recovered are in the soluble form, the solution may be passed through a non-copper metal recovery step (which is hereinafter described) followed by the electrolytic recovery of pure copper. The electrolytic recovery of copper is carried out in an electrolytic cell which is divided into a series of anode and cathode chambers, each including therein their respective electrode. The chambers are preferably divided by inert membranes which are resistant to attack by the electrolyte. The membranes should be substantially impermeable to the electrolyte flowing in the chambers, but must of course permit the flow of electricity through the electrolyte which saturates the membrane. It has been found that African Blue Asbestos provides good results and is a preferred material together with fiber glass. The woven cloth form of asbestos appears to be superior to the type formed with phenolic resins since the electrical resistance of the phenolic resin asbestos interferes with the electron flow between the electrodes.

Carbon[1] electrodes have been found to be particularly useful because of their long life. Other electrode material can be carbon, copper, copper-silicon, aluminum oxide and generally any material useful for this purpose and which is resistant to the electrolyte solutions. When carbon cathodes are used, the copper formed in the cathode chamber will be in the form of precipitated copper powder. On the other hand, if copper cathodes are used, the copper metal formed in the cathode chambers although still considered powder, forms as a weak, granual plate on the copper electrode. The voltage across the cell is maintained at a value slightly greater than the theoretical value of 1.4 volts at 90°–150° F. In actual practice the voltage is maintained at 1.63 volts and a temperature of about 62° F. Operating a current density of 10 amperes per square foot of cathode electrode provides 1 pound of copper per 24 hours of operation.

The process requires, as previously discussed, that the electrolytic cell be constructed in such manner as to preferably feed the electrolyte flowing in the cathode chambers from a generally low elevation and remove the solution from this chamber at a generally higher elevation, in other words, feed at the bottom of one end and remove from the top of the other end of the cell. Also, the reverse construction is made for the anode chambers. The electrolyte in the anode chamber is preferably fed at the top and removed at the bottom. As the electrolytes pass through the anode and cathode chambers their specific gravities change as the various electrolytic reactions take place. The electrolyte effluent solution from the cathode chamber has a lesser specific gravity than the specific gravity of the inlet electrolyte. The reverse is true of the electrolytic solution flowing through the anode chambers.

The cuprous solution which is discharged from the leaching vessel, and which has optionally been stripped of its non-copper metals, is the solution which is used as the electrolyte in the electrolytic cell. Preferably the solution is saturated with the soluble cuprous chloride complex. During normal operation this solution contains about 1 pound of cuprous copper for each gallon, the cuprous copper being in the form of its soluble complex of cuprous chloride. Prior to being fed into the electrolytic cell, the cuprous chloride complex solution is divided into two streams, each carrying approximately ½ of the original solution. One stream is the anode feed and the other is the cathode feed. These electrolytic solutions are passed through their respective anode and cathode chambers where the following electrolytic reactions are believed to occur:

Anode reaction:

$$Cu^+ \longrightarrow Cu^{++} + e^- \quad (5)$$
$$Cu(Cl)_2^- \longrightarrow Cu^{++} + 2Cl^- - 2e^- \quad (6)$$
$$\overline{Cu^+ + Cu(Cl)_2^- \longrightarrow 2Cu^{++} + 2Cl^- + 2e^-} \quad (7)$$

Cathode reaction:

$$Cu^+ \longrightarrow Cu^\circ - e^- \quad (8)$$
$$Cu(Cl)_2^- \longrightarrow Cu^\circ + 2Cl^- - e^- \quad (9)$$
$$\overline{Cu^+ + Cu(Cl)_2^- \longrightarrow 2Cu^\circ + 2Cl^- - 2e^-} \quad (10)$$

Total reaction:

$$2Cu^+ + 2Cu(Cl)_2^- \longrightarrow 2Cu^\circ + 2Cu^{++} + 4Cl^- \quad (11)$$

[1] Graphite.

As noted above, the anode chamber effluent comprises cupric ion and the cathode chamber effluent, after precipitation of the copper metal, may in the extreme case be devoid of copper ion, and merely be a solution of the solubilizing agent, such as a saline solution. However, for practical purposes, the cathode chamber is not operated so as to remove all of the copper therein. For example, only about one -half of the copper is removed, and the remainder stays in the effluent solution as the soluble cuprous copper complex. These two exit streams are combined to form the leaching solution. The electrolytic reactions also provide for the regeneration of solubilizing agents such as alkali metal chloride which also forms a necessary part of the leaching solution. As a result thereof, the leaching solution is regenerated and forms, on the same basis as described above, about ½ pound of cupric copper for 1 gallon of solution together with the stoichiometric or greater proportion of alkali metal chloride as previously described.

The leaching solution comprising cupric chloride and the solubilizing agent is recycled to a holding tank.

Figure 2:
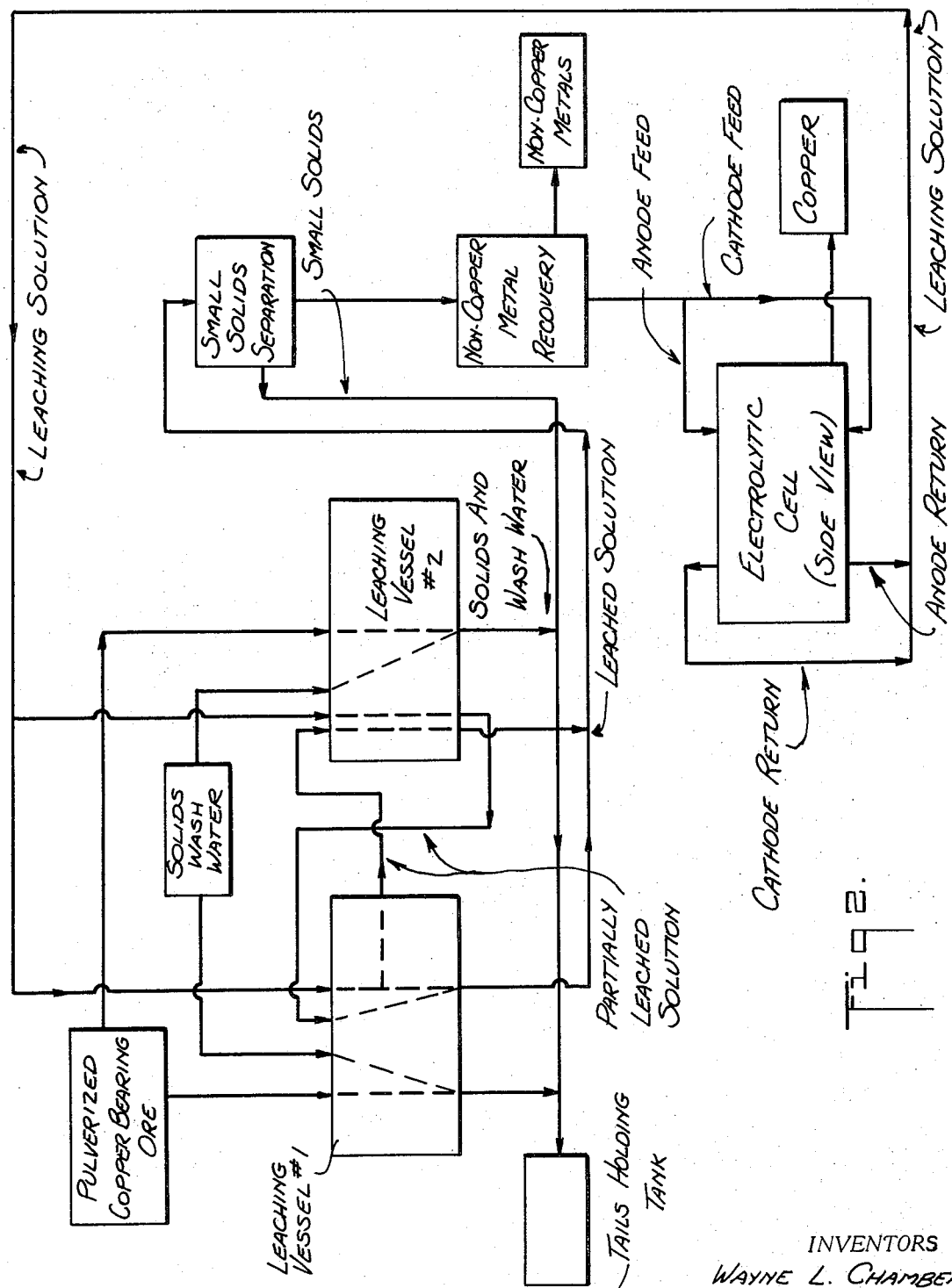
FIG. 2 is a block form flow diagram showing the process in greater detail.

Referring now to FIG. 2. Two leaching vessels are shown which are used alternatively first as leaching vessels are shown which are used alternatively first as leaching vessels for raw ore followed by secondary leaching with once used leaching solution and then in the reverse order. When the raw ore has been deposited into leaching vessel #1 it is treated with leaching solution which has completed the secondary leaching of ore in leaching vessel #2. The process is described as follows: Raw ore is placed in vessel #1; twice treated ore is in vessel #2; the once used leaching solution from vessel #2 is pumped into vessel #1 in order initially to treat the raw ore; the twice treated ore in vessel #2 is washed as hereinafter described and transferred to the tails holding tank; the raw ore in vessel #1 is initially treated with the once used leaching solution; after initial treatment of the raw ore, the twice used leaching solution is transferred to the small solids separation unit; fresh leaching solution is added to vessel #1 in order to give the ore therein a secondary treatment. The process continues, alternating as described. The solids and heated leaching solution are maintained in contact under agitating or pulverizing conditions. The period of leaching contact is in the range of about 1–6 hours, again depending upon the temperature of operation and the tenor of the ore. In one example, contact as maintained for about 2 hours at a temperature of about 200° F. It should be noted that the dual leaching operation described requires that the fresh leaching solution initially contact ore which has already been leached—and the reverse is true for the raw or fresh ore. Fresh ore initially contacts leaching solution which has already acted upon ore.

The dual vessel countercurrent leaching system described is the preferred process operation. However, it is clear that it is possible to use only one leaching vessel or on the other hand more than the two herein described. In the latter instance, the process operation would merely comprise a series of countercurrent leaching operations wherein the leaching solution would move in the direction of increasingly fresh ore.

The resulting solution which is the effluent from the secondary leaching vessel is then transferred to a small solids separation unit such as a vacuum filter, a cone thickener or the like. Again this process step should be carried out in the absence of oxygen. The liquid is then transferred to the noncopper metal recovery unit where these metals are removed from the solution and recovered. The solids removed from the small solids separation unit are transferred to a tails holding tank.

Turning back to the twice leached ore solids of the secondary leaching vessel. After this leaching operation and subsequent to removal of the leaching solution the remaining solids in the vessel are washed with a hot aqueous solution hereinafter described. The temperature of the solution is preferably raised since the residual metals are more easily removed from the remaining ore with increased temperature. The remaining solids and the aqueous washing solution are then transferred into the tails holding tank referred to above and combined with the small solids separated from the resulting solution in the small solids separation unit.

Figure 3:
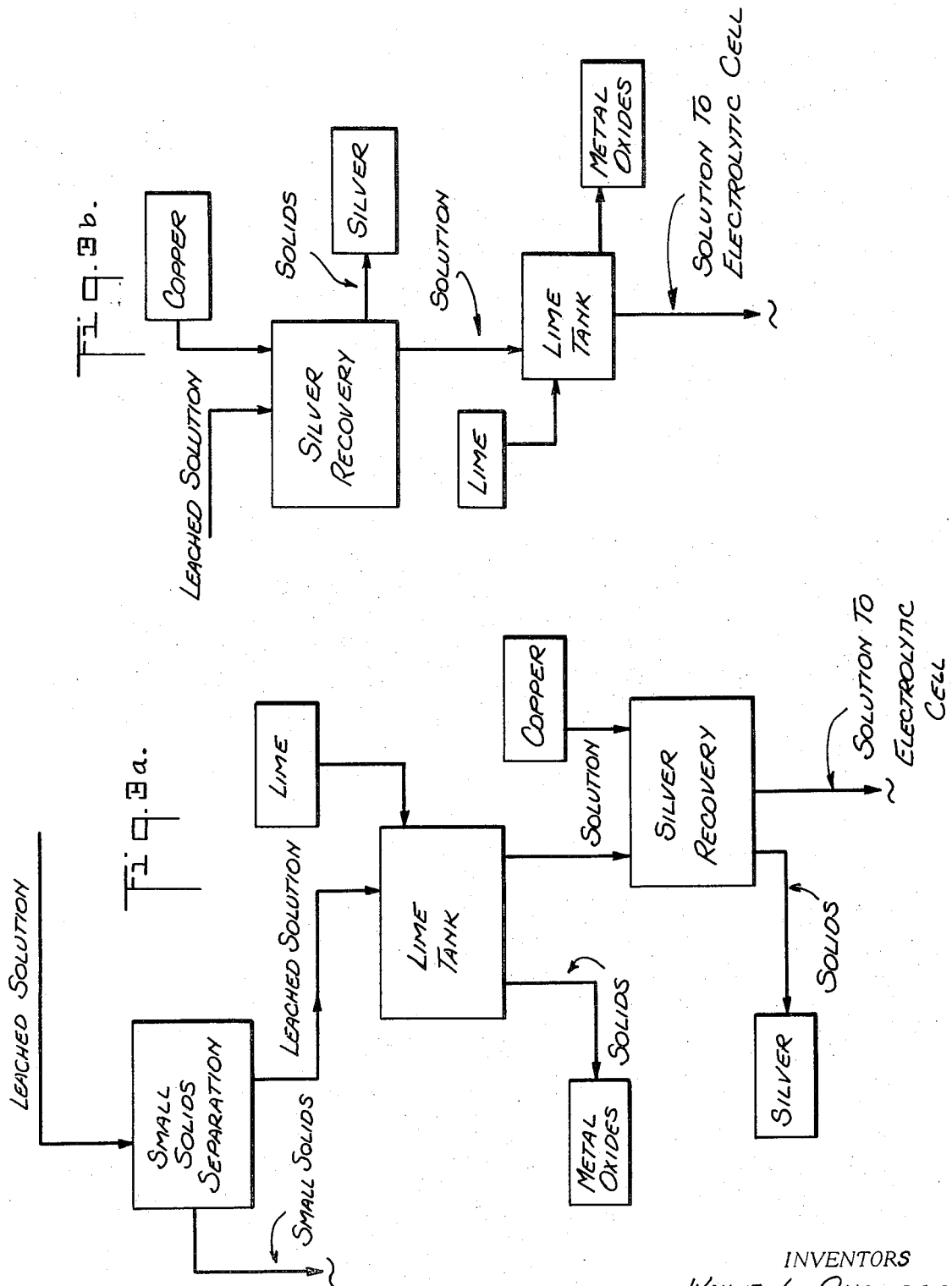
FIG. 3 is a block form flow diagram showing the non-copper metal recovery steps.

Referring now to FIGS. 3(a) and (b). The liquid effluent from the small solids separation unit may have the non-silver and copper metals therein removed from the solution as a first operational step followed by silver and then copper recovery as in FIG. 3(a), or the non-silver and copper metals may be recovered after silver recovery as in FIG. 3(b). The preferred embodiment is that shown in FIG. 3(a) because the solution temperature does not have to be maintained at a relatively high value in order to keep the non-silver and copper metals in solution while the silver has been recovered. In fact, one method for recovering some of these metals is to reduce the solution temperature thereby causing precipitation of some of the metal chlorides. In the embodiment shown in FIG. 3(a), the solution is transferred from the small solids separation unit to a lime mixing tank. In that tank calcium oxide is added to the solution thereby causing the metal chlorides other than silver and copper to precipitate from the solution as their insoluble metal oxides. These solids are removed for further treatment as necessary and the solution is transferred to the silver recovery unit. The sliver recovery unit merely comprises a vessel wherein copper metal is present and when brought in contact with the solution, the copper metal replaces the silver ion in accordance with the following equation which is believed to take place:

$$Na^+ + (AgCl_2)^- + Cu^\circ \rightarrow Na^+ + (CuCl_2)^- + Ag^\circ \quad (12)$$

The precipitated silver metal is recovered and the remaining solution is then transferred to the electrolytic cell for processing as hereinbefore described. Again, in all these operations the process should be carried out in the absence of oxygen.

Referring now to FIG. 3(b). The effluent solution from the small solids separation unit under oxygen-excluding conditions and at temperatures high enough to prevent precipitation of some [2] of the non-silver and copper metals therein (temperature of discharge from leaching-agitation units) is passed to the silver recovery unit and the process described in FIG. 3(a) is performed. After recovery of the silver the remaining solution is transferred to the lime tank where the process described in FIG. 3(a) is again performed. After removal of the metal oxides the resulting solution is transferred to the electrolytic cell for processing as hereinbefore described. Again it is pointed out that these processes are all carried out under oxygen excluding conditions.

In addition to the two methods of recovering the non-silver and copper metals described above, namely, that of temperature reduction in order to reduce solubility and lime addition in order to precipitate the metal oxides, the following methods are also useful. The temperature may be reduced gradually and under quiescent conditions. As a result, the metal chlorides in solution form layered gradients in accordance with the specific gravity of the various metal chloride solutions. For example, the heaviest metal chloride solution forms a bottom-most layer with the formation of successive metal chloride solution layers one above the other in order of decreasing specific gravity. Recovery of the metal chloride solutions is readily accomplished by conventional means of removing the various liquid layers. Another method is to replace the lime with a polyelectrolyte or a plurality of these materials in the event that there are metal salts present in the solution which would not be acted upon by a single polyelectrolyte. The polyelectrolytes cause flocculation or precipitation of the metallic materials. Again, these metals and metal compounds are recovered from the solution and treated as necessary. The polyelectrolyte may be recovered and regenerated for reuse.

Another method consists of the use of selective ion exchange material which is selective for the various metals sought to be recovered. In one embodiment, a cation exchange resin in the copper or silver form may be used to exchange the metal ions in the solution. The copper or silver in the solution as a result of being ion exchanges with the other metals is then recovered in the subsequent silver and/or copper recovery operations.

Another method comprises bubbling hydrogen sulfide gas through the solution thereby precipitating the metal sulfides from the solution. If any cupric chloride is present in the solution it will also be reduced to cuprous chloride.

Figure 4:
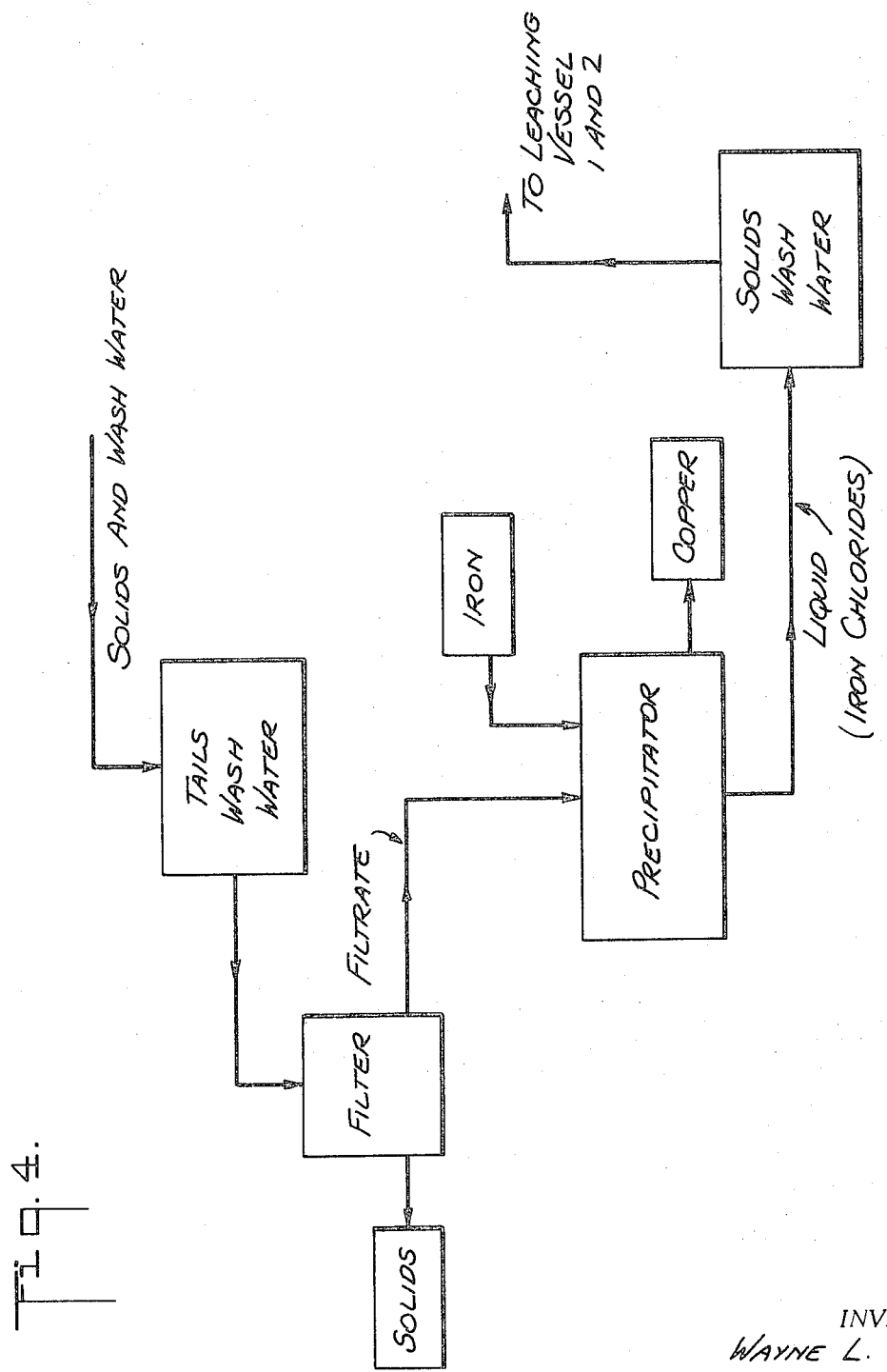
FIG. 4 is a block form flow diagram showing copper recovery from the treated solids (tails) material.

Referring now to FIG. 4. The solids and liquid in the tails holding tank are transferred to a filter unit which may be any of the usual industrial filters. For example, they may include drum vacuum filters and the like. The solids may be passed to waste (or treated for sulphur, and/or noble metal recovery as hereinafter described) and the liquid filtrate transferred to a precipitator tank wherein metallic iron is introduced to the solution. Any copper chlorides in solution will be reduced by the metallic iron and precipitated as copper cement and metallic copper and the iron is oxidized to its chloride salts of ferrous, ferric chloride. The copper cement and metallic copper is separated from the liquid and is a product of this process. The liquid solution is then recycled and used as the solids wash water as shown in FIG. 2 and previously referred to.[3]

The copper cement which precipitates as a result of the reaction with metallic iron is not as pure as the copper produced in the electrolytic cell. Accordingly, it may be transferred to the leaching vessel where it proceeds through the system as if it were part of the ore being treated. The reaction whereby metallic iron replaces copper in the cupric or cuprous copper solution in the precipitation tank is believed as follows:

$$3CuCl_2 + 3CuCl + 4Fe^\circ \rightarrow 6Cu^\circ + 3FeCl_2 + FeCl_3 \quad (13)$$

If the ore being treated contains economically valuable gold and/or other noble metals therein, they may be removed as follows: The solids from the filter shown in FIG. 4 are subjected to a floatation process wherein these tails are mixed with water and a reagent such as light oil which reagent selectively coats the sulphur in the tails with a substance to which air bubbles attach themselves. The sulphur is recovered from the froth formed on top of the water. Thereafter, the remaining solids are separated into their components by gravity concentration utilizing a jig or table. Here the heavy gold, platinum, or other noble metals, or their minerals are separated from the bulk of the lighter gangue or tails. The barren tails are then disposed of and the recovered materials may be processed to purify and concentrate them. For example, gold or the mineral containing it may be recovered by roasting it with a halide salt such as sodium chloride to convert the gold to gold chloride. The gold chloride is then dissolved in water and gold is precipitated from the solution by either bubbling chlorine gas through it or by adding another solution containing an excess of chloride ions. Alternatively, the gold chloride can be reduced to the metallic state by means of electrolytic reduction. Similarly, the other noble metals in the ore can be likewise recovered.

---

[2] I.e., lead chloride, mercuric chloride.

[3] The ferrous chlorides are used to advantage to convert cuprous and/or cupric copper oxides in the ore to copper chlorides. The reaction equation is believed to be as follows:

$$Cu_2O + 3CuO + 3FeCl_2 \rightarrow 4CuCl + CuCl_2 + FeO + Fe_2O_3 \quad (14)$$

EXAMPLE

An operating pilot plant was constructed as described in the flow sheet diagrams of FIGS. 1–4. Copper-bearing ore, which was previously crushed to a particle size of between about 40 and 200 U.S. mesh was used as the raw material source of copper. The process was carried out on a semi-continuous basis and produced powdered metallic copper in accordance with the herein described method.

The ore had a copper content of about 5% and also contained silver, iron, lead, zinc, titanium, manganese, in various proportions, the silver being present in proportion of about 40 ounces/ton. The copper was present in the ore as copper carbonate, copper sulfide, and the cuprous and cupric oxides of copper.

On an ongoing basis, 2½ tons of pulverized ore were fed into agitating leaching vessel #1 which was a foundation mounted commercial cement mixer[4] having a volume of 9 cubic yards. This represented about 250 pounds of copper. The leaching solution from leaching vessel #2 was pumped into vessel #1. The leaching solution was 500 gallons of an aqueous solution containing 250 pounds of cupric chloride, saturated with sodium chloride. The temperature of solution was about 130° F. and maintained thereabout in vessel #1 for the next 4 hours during which time the agitator was running. Atmospheric oxygen was not a problem since the water at the temperatures of operation and the design of the mixer prevented oxidation of the cuprous chloride.

At the end of the 4 hour period the resulting aqueous solution, which comprised the sodium complexes of cuprous chloride and silver chloride and chlorides of the other metals which were leached from the ore was drained from vessel #1 and pumped (by an air excluding pump) to a settling tank where small solid particles were permitted to settle out from the solution. The small particle solids were combined with the twice leached solids of leaching vessel #2 as hereinafter described. An oxide crust formed on the liquid surface of the settling tank. This crust acted to prevent further reaction of oxygen with the copper in the solution below.

The temperature in the settling tank was maintained in the range of 70° F. to 80° F. The solution was kept in the settling tank for about 24 hours after which the solids were removed and the solution was transferred to a lime tank (see FIG. 3(a)). (If a filter press were used, the time would be reduced.)

An excess of lime (CaO) was added to the solution. The metal oxides of iron, lead, zinc, titanium and manganese were immediately precipitated from the solution and allowed to settle. The metal oxides were separated from the solution by merely draining or decanting the solution. A cuprous oxide crust formed on the surface of the liquid solution. The temperature was permitted to drop to the range of about 60° F. by merely not providing any heat to the process at this point.

The solution was then transferred to a silver recovery tank where copper metal was added to the solution. The copper replaced the silver in the complex and precipitated the silver metal which was recovered by removing the containers into which it had precipitated. Again, a cuprous oxide crust formed on the surface of the liquid solution.

The aqueous solution, which at this time contained essentially the sodium complex of cuprous chloride, was divided into two streams—each stream carrying about ½ of the original volume of solution. Each stream was continuously fed into a distribution header for either the anode chambers or cathode chambers of an electrolytic cell similar to the cell schematically described in FIG. 1. The cell contained 10 anode chambers and 10 cathode chambers divided by woven fiberglass membranes. The electrodes in each chamber were conventional carbon electrodes which extended through the entire lengthwise area of the chambers. The cells were approximately 8 feet by 3 feet 5 inches by about 3 feet in width. The total electrode surface area was 200 square feet. The flow rate through the cell was approximately 26 gallons per hour. The cell temperature was about 62° F. The voltage across the electrodes was maintained at 1.63 volts. The current density was 10 amperes per square foot of cross-sectional area. At this rate, about 200 pounds of copper were precipitated in the cathode chambers in a 24 hour period. The liquid effluents from the chambers (top removal from cathode chamber and bottom removal from the anode chamber) were recombined and used as the leaching solution. An oxide crust formed on the liquid surface of the cell.

The copper product assay was 99.90% pure powdered copper.

The electrolytic cell was not operated to extract all of the available copper as metal from the cathode stream. To do so would have required an excessive amount of time and given rise to increasing inefficiencies in the electrical transfer process. The electrolytic reduction of copper was permitted to proceed only to about 50% of the theoretical end point, and the remainder of the solution was recombined and reused, as described.

The leaching solution, which consisted of the combined effluents from the anode and cathode chambers, was pumped to a leaching solution holding tank. The solution was then heated as it passed through coils of a gas fired oven to a temperature of about 130° F. and then fed into the leaching vessel which contained once leached ore. The vessel contained an impeller which kept the solution and the solids in agitated contact for about 4 hours. The temperature was maintained at about 130° F. by means of steam in the jacket of the vessel. A crust, as described, formed on the surface.

The solution was then transferred to the other leaching vessel where the process continued as previously described.

After the ore had been leached for the second time, it was comixed with 1000 gallons of an aqueous solution comprising sodium chloride and 10% iron chlorides. The solution temperature was approximately 130° F. After 1 hour of agitation the mixture was pumped to the tails holding tank where it was combined with the small solids separated from the settling tank, as previously described.

The liquid-solid mixture was then filtered on an vacuum drum filter and the solids treated for noble metal recovery, and the filtrate was treated for copper recovery as in FIG. 4.

The solution was transferred to a precipitator tank where iron metal sufficient to provide at least a stoichiometric replacement for the copper in the solution was added to the solution. After 1 hour, 25 pounds of copper cement and metallic copper were precipitated. The copper was separated and returned to the process as part of the fresh ore feed. The liquid, which comprised ferrous and ferric chlorides, and sodium chloride was used as the aqueous solution for washing the twice treated ore.

The solids from the drum filter were then mixed with water and sulphur floatation reagents such as pine oil. Air was blown through the admixture and sulphur was recovered by skimming the resulting froth.

The remaining solids were then gravimetrically treated on a jig. The noble metals of gold, platinum and irredium stratified according to their specific gravities and were separately recovered. The remaining solids were disposed of as waste.

The following represents a listing of the materials of construction, which representatively can be used for the equipment of this process since the solutions which are used are highly corrosive. Where equipment is not listed, conventional material may be employed. Generally, iron and all other metals, natural rubber, nylon, or other materials of construction which are attacked by chlorides should not be used. Useful construction materials include concrete, steel and plywood vessels lined with fiber glass, ---
[4] Fiber glass lined.

glass, polyvinylchloride, polypropylene, and the like. Also, the vessels can be constructed of ceramic materials. Associated equipment such as pumps, agitators, conduits, etc., should likewise be made of chloride and corrosion resistant materials. Filters may also include silica sand units and Teflon units.

In addition to the crust formation method of excluding oxygen from the various solutions of the process, other methods may be used. For example, an inert atmosphere such as nitrogen or neon gas may be used to blanket the units. Or, an inert lighter-than-solution liquid, such as certain oils, may be used to cover the solution surface. Another method includes the use of an inflatable tank, i.e., a collapsed polyethylene bag into which the solution is pumped through a tightly fitting opening thereby causing the bag to fill up only with the solution to the exclusion of air.

Agitation in the various units can also be accomplished by, for example, bubbling an inert gas through the vessel and by using sonic agitation.

Heating, where required can be accomplished by jacketed vessels through which steam or other heat transfer medium can be flowed. Also, gas fired and electric ovens and heat exchangers can be used.

As for the electrolyte, or leaching solution, water has been used for reasons of economy and convenience. However, other materials may be used in which solution and ionization, as required, will occur. For examples, polar fluids such as alcohol (e.g., $C_1$–$C_5$ alcohols, phenol) and lower molecular weight organic acids may be used. Where non-aqueous solutions are used, special care should be used to preserve these materials in view of their cost.

Any spilled cuprous complex which may be oxidized to cuprous oxychloride may be recovered by heating the oxide crust to about 700° F.–800° F. in order to drive off the oxygen and reform cuprous chloride.

The tenor of the copper bearing ore will determine the degree of pulverization required during the leaching operation. For example, it has been found that ores which have a significant sulphur content require continuous pulverization during leaching. Otherwise excess periods of time are necessary to leach the ore. It is believed that the sulphur in such sulphur-containing ores tend to coat the copper values of the ore and interfere with the leaching operation. Under such conditions, continuous pulverization tends to break up the coated ore, thereby continuously presenting a fresh copper-bearing surface to the leaching solution. In practice, it has been found that the best way to determine the degree of pulverization required for adequate leaching is by means of empirical trial.

We have also found that the cathode chambers of the electrolytic cells can be partially filled with an inert liquid which is not susceptible to attack or other reaction by the influent electrolyte or the reduced solution. By this method of operation the copper which is precipitated in the cathode chambers are deposited within this inert liquid and thereby protected from the action of cupric chloride solution. In another modification of this embodiment, the cathode chambers are in communication with one another through conduit means extending from the bottom-most parts of the respective cathode cells. Preferably the chamber into which the conduit means from the respective cathode chambers terminate is a chamber having vertically tapered walls. The inert solution referred to above, is used to fill the tapered chamber and conduit means to a level at least about to the bottom-most portion of the respective cathode chambers. In this embodiment, the precipitated copper drops through the inert solution in the conduit means and is collected in the tapered chamber. Of course, the inert solution referred to is a non-electrical conductor. Examples of such inert liquids include hydrocarbon oils having densities greater than the above described solutions. Of course, the precipitated copper is readily recovered from the electrolytic cell of these embodiments by conventional draw-off procedures.

It is again important to note that the herein described process avoids and eliminates the pollution problems inherent in the prior art copper roasting processes. The noxious sulphurous fumes have been eliminated from this process. Accordingly, it is one of the unique benefits of this process that in addition to economic feasibility and ease of operation, the ecological environment surrounding a plant which produces copper in accordance with this process is not polluted.

It will be understood that it is intended to cover all changes and modifications of the drawings of the invention herein chosen for the purpose of illustration which do not constitute departures from the spirit and scope of the invention.

We claim:

1. A process for producing metallic copper comprising the steps of:
   (1) leaching a copper-containing ore with a leaching solution under substantially oxygen-free conditions, said leaching solution comprising cupric chloride and a solubilizing agent for cuprous chloride, said leaching being for a time and at a temperature sufficient to chemically convert at least a substantial proportion of the copper in said ore to a reaction product of said copper and said agent wherein the copper in said product is part of the anion of said product, which product is soluble in the resulting solution;
   (2) separating the remaining solids from said resulting solution subsequent to said leaching step, while maintaining said substantially oxygen-free conditions;
   (3) electrolytically (a) reducing at least a portion of said resulting solution to precipitate copper metal from said reduced solution and (b) oxidizing at least a portion of said resulting solution to produce a solution comprising cupric chloride; said electrolytic reduction and oxidation being carried out under conditions whereby the reduced solution is of lesser specific gravity than said resulting solution, and whereby the oxidized solution is of greater specific gravity than said resulting solution, while maintaining said substantially oxygen-free conditions;
   (4) combining: (a) the reduced solution of said reduction step with (b) the oxidized solution of said oxidation step; while maintaining said substantially oxygen-free conditions, and thereby forming said ore leaching solution; and,
   (5) recovering said precipitated metallic copper.

2. The process of claim 1 wehrein said copper metal is precipitated in its powder form.

3. The process of claim 2 wherein said powdered copper metal is at least 99.90% pure.

4. The process of claim 1 wherein said leaching is performed in the presence of an aqueous leaching solution and under pulverizing conditions.

5. The process of claim 4 wherein said ore is pulverized prior to said leaching step.

6. The process of claim 1 wherein said leaching is performed under aqueous conditions and said solubilizing agent is an alkali metal halide wherein the reaction product of said agent and cuprous chloride is a water soluble alkali metal cuprous halide complex.

7. The process of claim 6 wherein said complex is sodium cuprous chloride.

8. The process of claim 7 wherein said leaching is carried out under pulverizing conditions.

9. The process of claim 7 wherein said resulting solution is saturated with said sodium cuprous chloride complex.

10. The process of claim 6 wherein said leaching solutiton contains about ½ pound of cupric chloride for each gallon of said solution and the proportion of solubilizing agent therein is at least the stoichiometric quantity required to form water soluble complexes with the copper and silver in said ore.

11. The process of claim 10 wherein said resulting solution contains about 1 pound of cuprous copper for each gallon of said resulting solution.

12. The process of claim 1 wherein the solvent carrier for said cupric chloride and solubilizing agent comprising said leaching solution, comprises a polar liquid selected from the group consisting of $C_1$-$C_5$ alcohols, phenol, and lower molecular weight organic acids.

13. The process of claim 1 wherein said resulting solution, subsequent to said separating step is divided into about two equal portions and wherein one of said portions is electrolytically reduced in cathode chambers of an electrolytic cell and the other of said portions is electrolytically oxidized in anode chambers of an electrolytic cell.

14. The process of claim 13 wherein said oxidized portion is removed from substantially the bottom-most part of said cathode chamber.

15. The process of claim 13 wherein said portion to be reduced is fed into said cathode chamber of said electrolytic cell at substantially the bottom of one end thereof and removed at substantially the top-most other end thereof; and said portion to be oxidized is fed into said anode chamber of said electrolytic cell at substantially the top of one end theerof and removed at substantially the bottom-most other end thereof.

16. The process of claim 15 wherein said substantially equal portions are continuously fed into and removed from said chambers respectively.

17. The process of claim 16 wherein approximately one-half of the cuprous copper in said cathode chambers is reduced to copper metal.

18. The process of claim 13 wherein said anode and cathode chambers are separated by solutiton impermeable membranes which permit flow of electricity therethrough.

19. The process of claim 18 wherein said membranes are selected from the group consisting of woven African Blue Asbestos and fiber glass.

20. The process of claim 13 wherein the electrodes in said electrolytic cell are carbon-graphite electrodes.

21. The process of claim 13 wherein the voltage in said electrolytic cell is maintained in the range of about 1.63 volts, the temperature is maintained in the range of about 61° F., and the current density is in the range of about 10 amperes per square foot of cathode electrode.

22. The process of claim 1 wherein said ore also contains non-copper metlalic materials and at least a portion of said non-copper metallic materials are removed from said resulting solution prior to said electrolytic step.

23. The process of claim 22 wherein said ore contains silver materials and wherein at least a portion of said silver is removed from said resulting solution by metal interchange between copper metal and silver ion in said resulting solution thereby precipitating silver metal.

24. The process of claim 12 wherein said non-copper metallic materials include metals selected from the group consisting of manganese, antimony, bismuth, iron, lead, zinc, cobalt, nickel, molybdenum, titanium chromium and mercury and wherein at least a portion of said metals are removed from said resulting solution by precipitation of their oxides with calcium oxide.

25. The process of claim 24 wherein said ore includes silver material and said silver is removed from said resulting solution by metal interchange between copper metal and silver ion subsequent to said calcium oxide precipitation step and thereby precipitating silver metal.

26. The process of claim 1 wherein said remaining solids are washed with a solution comprising ferrous chloride and subsequent to said washing step, separating said washing solution from the washed remaining ore and thereafter precipitating at least a portion of the copper in said separated wash solution by metal interchange between iron metal and copper ion in said separated wash solution.

27. The process of claim 26 wherein said wash step is carried out under heated conditions.

28. The process of claim 27 wherein the temperature during said wash step is in the range of about 130°–200° F.

29. The process of claim 26 wherein said washed remaining ore contains sulphur and noble means, and wherein said sulphur and noble metals are recovered from said washed remaining ore by initially removing said sulphur by flotation and thereafter recovering said noble metals from the remaining ore.

30. The process of claim 26 wherein said separated copper is admixed with said copper containing ore.

31. The process of claim 1 wherein said leaching time is in the range of at least about 1 hour and said temperature is in the range of about at least about 60° F.

32. The process of claim 31 wherein said time and temperature vary inversely with one another and wherein said time is in the range of about 1–6 hours and said temperature is in the range of about 60°–300° F.

33. The process of claim 1 wherein said ore is pulverized prior to said leaching step.

34. The process of claim 33 wherein said ore is copper concentrated prior to said leaching step.

References Cited

UNITED STATES PATENTS

| | | | |
|---|---|---|---|
| 1,251,485 | 1/1918 | De Luce | 204—107 |
| 1,195,616 | 8/1916 | Slater | 204—107 |

JOHN H. MACK, Primary Examiner

R. L. ANDREWS, Assistant Examiner

U.S. Cl. X.R.

204—106, 107, 109, 112, 114, 294, 295